2,930,778

PROCESS FOR THE PREPARATION OF SURFACE-ACTIVE COMPOUNDS

Fred E. Boettner, Philadelphia, Pa., assignor to Rohm & Haas Company, Philadelphia, Pa., a corporation of Delaware No Drawing. Application March 27, 1956 Serial No. 574,107

3 Claims. (Cl. 260—47)

This invention deals with a method for the preparation of high molecular weight polymeric surface-active compounds. It more particularly concerns the preparation of these compounds in a high degree of purity and in a substantially quantitative manner.

The compounds, that may be prepared by the method of this invention, may be represented by the formula

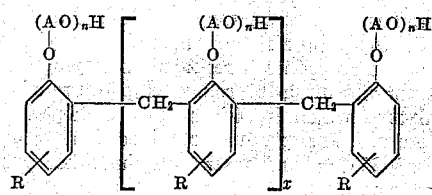

in which $x$ is an integer of six to twelve, $n$ is an integer of eight to eighty, A is an alkylene group of two to four carbon atoms, and R is an alkyl group of three to eighteen carbon atoms.

Prior methods for producing compounds of the above described type result in a mixture of heterogeneous products, predominately compounds in which $x$ has an average value of two to three as well as undesired compounds in which ether units cyclize with the benzene ring. Only relatively small portions of higher molecular weight compounds are obtained, that is, those in which $x$ is equal to six to twelve. In order to obtain an appreciable amount of these higher molecular weight materials, when previously known methods are employed, it is necessary to conduct, on the mixture of heterogeneous products that is obtained, tedious and time-consuming methods of alcohol extraction or vacuum stripping. The production of compounds of the higher molecular weights has become increasingly important with their increased use in known medicinal applications.

As a surprising concomitant result of producing higher molecular weight compounds there has been a marked drop in the physiological toxicity of the compounds with whose preparation this invention is concerned. This is an advantageous reflection on the purity and homogeneity of the products obtained and is important in that there is now possible more widespread use of the products in known medicinal applications, for instance, such as in aqueous sprays in oxygen tents to clear mucous from the nasal and oral passages of infants with respiratory ailments. The production of more pure compounds is, also, valuable in known non-medicinal applications such as laundering, cleansing, wetting, and the like, of textiles, dishware, and the like.

Methods previously used have, also, encountered problems of control. That is, either the reaction tends to run away, which frequently leads to the formation of undesired products, or the reaction becomes so vigorous that it is often necessary to employ precautionary measures in order to contain the reactants within the reaction vessel. No such elements of control encumber the present process because the instant reaction progresses in an orderly manner.

It is an object of this invention to provide an efficient, orderly method for the preparation of the specific high molecular weight compounds, defined heretofore and hereinafter.

The method of the present invention is essentially a two-step process. The first step consists of reacting an alkylphenol with trioxane to form a polymeric alkylphenolic compound. The second step consists of reacting the polymeric alkylphenolic compound with ethylene oxide to yield the final products defined above.

In the first step of this invention an alkylphenol, having the formula

in which R has already been defined, is brought together at a reacting temperature with trioxane in the presence of an organic sulfonic acid and an inert volatile organic solvent. Trioxane and only trioxane may be employed. Formaldehyde, either gaseous or in aqueous solution, as well as the other known revertible polymers of formaldehyde are not satisfactory for the present purposes. The difficulties stated previously are encountered to varying troublesome degrees if other than trioxane is used. Hence, in the present instance only trioxane may be used if the advantageous results of this invention are to be obtained.

The R substituent has already been defined as an alkyl group of three to eighteen carbon atoms. The R group may exhibit any of the possible isomeric forms. For instance, when R is octyl it may be n-octyl, isooctyl, t-octyl, 2,3-dimethylhexyl, 2,2,4-trimethylpentyl, 2,2,4,4 - tetramethylbutyl, and the like. While it is preferred that R be in the para position it may be located at any of the possible positions on the benzene ring.

Typical of the alkylphenol reactants that may be employed are p-isopropylphenol, o-n-butylphenol, m-isobutylphenol, p-t-butylphenol, m-n-pentylphenol, o-isohexylphenol, o-n-hexylphenol, p-t-hexylphenol, m-n-heptylphenol, p - t - octylphenol, p-2-ethylhexylphenol, p-n-octylphenol, m-n-nonylphenol, p-t-decylphenol, o-sec-undecylphenol, p-n-dodecylphenol, p-t-dodecylphenol, m-n-tetradecylphenol, p-n-hexadecylphenol, and p-sec-octadecylphenol.

The reaction between the defined alkylphenol and trioxane is conducted in the presence of a strong organic sulfonic acid catalyst, for instance, an arylsulfonic acid, such as o, m, or p-toluenesulfonic acid or benzenesulfonic acid, or an alkanesulfonic acid, such as butanesulfonic acid or octanesulfonic acid. At the conclusion of the first step the acid catalyst is removed by an aqueous wash, preferably with a small amount of ammonium hydroxide contained therein to assure neutralization and removal of all of the catalyst. Actually, if the lightest possible colored product is desired, and if other considerations warrant the extra effort, it is desirable to employ two or three aqueous washes followed by an aqueous wash containing a small amount of ammonium hydroxide.

An inert volatile organic solvent, preferably aromatic, is employed such as benzene, toluene, xylene, heptane, octane, nonane, and the like. Toluene is particularly useful in this respect. The solvent serves to hold the reactants and catalyst in intimate proximity and, also, aids in maintaining a constant reaction temperature as will be apparent hereinafter. At the conclusion of the present process the solvent is removed by conventional methods such as by evaporation or by distillation, preferably under reduced pressure.

The alkylphenol and trioxane are reacted at the reflux temperature of the reaction mixture. The reflux temperature of the reaction mixture will, of course, vary somewhat with the particular alkylphenol being used and the solvent employed. Generally, reflux temperatures in the range of about 80° to 145° C. have been found to be most practical. Temperatures appreciably above 145° C. tend to produce compounds that are more darkly colored and such is usually not desired. As the reaction progresses water distils from the reaction mixture. The reaction is continued until the theoretical amount of water is collected. This is a convenient and actually the only practical criterion for the determination of the completion of the reaction.

The alkylphenol and trioxane reactants are preferably employed in molar ratios of about one of the alkylphenol to 0.3–0.33 of trioxane. When the alkyl group is in the meta position, with respect to the hydroxy group on the benzene ring, it is preferred to use no more than about 0.3 of a mol of trioxane for each mole of the alkylphenol. When alkylphenols are used that have the ortho and para positioned alkyl groups the preferred molar ratio is one of the alkylphenol to about 0.3–0.33 of trioxane.

At the end of the first step of the present process the acid catalyst is removed by a water wash, preferably two or three water washes, as previously discussed, in the last of which there is a small amount of ammonium hydroxide to assure complete removal of the acid catalyst. The polymeric alkylphenolic compound is preferably retained in the solvent and is ready for the second step of the instant process.

The polymeric alkylphenol from step one is condensed with an alkylene oxide, such as ethylene oxide, propylene oxide, or butylene oxide, or mixture thereof, preferably ethylene oxide, preferably in the presence of an alkali metal hydroxide catalyst, such as sodium hydroxide, potassium hydroxide, lithium hydroxide, and the like, in the amounts of eight to eighty molecular equivalents of alkylene oxide for each equivalent of phenol. It is desirable to maintain essentially anhydrous conditions during the step two part of the present process or at least to limit the presence of water to a practical minimum. This condensation may be conducted at lower temperatures and atmospheric pressure or at elevated temperatures and super atmospheric pressures as desired. At the conclusion of the condensation, the reaction mixture is neutralized with a mineral acid, such as aqueous 50% sulfuric acid. The product may be used without additional procedures of isolation. If it is desired to remove the small amount of salt formed by the neutralization of the alkali metal hydroxide catalyst by the mineral acid, water may be added to the reaction mixture and preferably toluene, if such is not already the solvent present. The mixture is stripped down to the toluene and then filtered to remove the salt. The filtrate is then stripped to remove the toluene, leaving the product as the residue.

The products thus obtained by the method of this invention are valuable light-colored compounds of high molecular weight and a high degree of purity not previously possible without attendant cumbersome and time-consuming techniques of extraction or the like. Furthermore, the present inventive method yields the desired high molecular weight products in substantially quantitative amounts, which is an increase of at least 25 to 30 fold over the known methods.

The method of this invention may be more fully understood from the following illustrative examples in which parts by weight are used throughout.

EXAMPLE

There are placed in a three-necked round bottom flask, having a stopcock in the bottom thereof and provided with a mechanical stirrer, a dropping funnel, a thermometer, and a reflux condenser with a modified Stark-Dean water separator between the flask and the condenser, 206 parts of p-t-octylphenol, 102 parts of toluene, and 2 parts of p-toluenesulfonic acid monohydrate. The resulting solution is heated at 95° to 100° C. while a solution of 50 parts of toluene and 30 parts of trioxane is added over a period of three hours. The temperature of the reaction solution is maintained at reflux, first 115° to 130° C. and later 110° to 120° C., while water is being evolved and collected in the water separator. The reaction is continued until the separation of water ceases, which is about two hours after the completion of the addition of trioxane. The mixture is cooled to 100° C. and 150 parts of toluene is added. The mixture is stirred for ten to fifteen minutes and, then, 75 parts of water is added thereto. The mixture is stirred for thirty minutes and then allowed to settle and separate into layers for thirty minutes. The water layer is drawn off. The water wash and separation procedure is repeated twice, then 0.6 part of aqueous 28% ammonium hydroxide is added. The reaction mixture is stirred while being heated to 110° C. When the temperature of the mixture reaches 110° C. a vacuum is slowly applied to the system by means of a water pump to facilitate the stripping of water and toluene. The stripping is continued until the pot temperature reaches 175° C. The remaining resin is removed from the flask and allowed to cool to an amber glassy solid. The resin gives a viscosity of 1800 centipoises as a 64% solution in toluene and has a molecular weight of 2568± as determined by the boiling point elevation method employing acetone.

The above procedure is repeated employing benzene as the solvent and using the reflux temperature of the reaction mixture, which is 80° to 110° C., as the reacting temperature. The product obtained had a molecular weight of 2557± and resembled the other product in every respect.

The above resin, in 80 parts of toluene, is reacted with 12 equivalents of ethylene oxide, for every equivalent of phenol, in the presence of two parts of sodium hydroxide at 125° to 150° C. in an autoclave. The toluene is removed by steam distillation and the water by vacuum distillation. The product corresponds to the compound having the formula

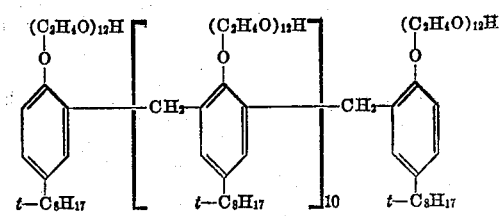

In a similar manner, propylene oxide and, also, butylene oxide are employed with isopropylphenol and n-octadecylphenyl respectively, to form products having the formulas

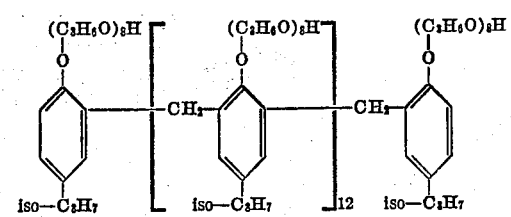

and

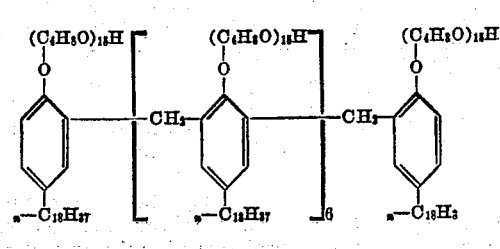

respectively.

In like manner, there are prepared by reacting ethylene oxide with n-decylphenol and t-tetradecylphenol, respectively, products having the formulas

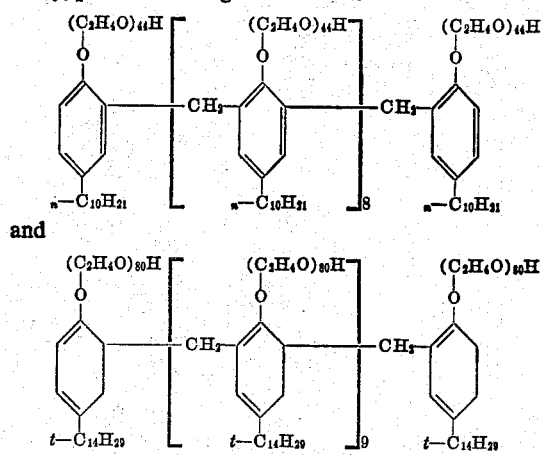

respectively.

There are also prepared in a similar way, at the end of step one of the process of this invention, resins having the following molecular weights, determined as discussed previously:

Table I.—Resins from step one

| Phenol used: | Molecular weight |
| --- | --- |
| p-Isopropylphenol | $1656 \pm 16$ |
| p-t-Butylphenol | $2178 \pm 8$ |
| p-t-Hexylphenol | $2230 \pm 64$ |
| p-t-Octylphenol | $2557 \pm 27$ |
| p-n-Octylphenol | $1946 \pm 36$ |
| o-n-Octylphenol | $2380 \pm 40$ |
| m-2-ethylhexylphenol | $1786 \pm 12$ |
| p-n-Nonylphenol | $2648 \pm 49$ |
| p-t-Decylphenol | $2717 \pm 47$ |
| p-n-Dodecylphenol | $1996 \pm 16$ |
| p-t-Dodecylphenol | $2960 \pm 40$ |
| p-sec-Octadecylphenol | $1815 \pm 15$ |

The above resins of Table I are reacted with eight to eighty equivalents of ethylene oxide, propylene oxide, or butylene oxide for each equivalent of phenol to form the useful products with which the method of the present invention is concerned. The light-colored, high molecular weight products obtained from the instant method are then ready for a wide variety of known applications, already discussed.

I claim:

1. A method for the preparation of compounds having the formula

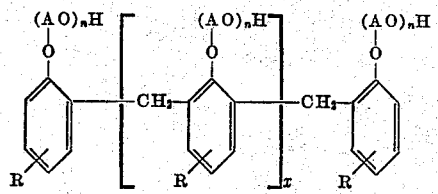

in which $x$ is an integer of six to twelve, $n$ is an integer of eight to eighty, A is an alkylene group of two to four carbon atoms, and R is an alkyl group of three to eighteen carbon atoms, which comprises bringing together at the reflux temperature in the range of about 80° to 145° C. a compound having the formula

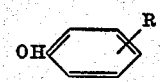

with trioxane in molar proportions of about 1 to 0.3–0.33 respectively, in the presence of a strong organic sulfonic acid and an inert volatile organic solvent, to form a polymeric alkylphenol having an average molecular weight of at least 1640, removing said acid from the reaction medium, and then condensing in a substantially anhydrous medium said alkylphenol with an alkylene oxide having two to four carbon atoms.

2. A method for the preparation of compounds having the formula

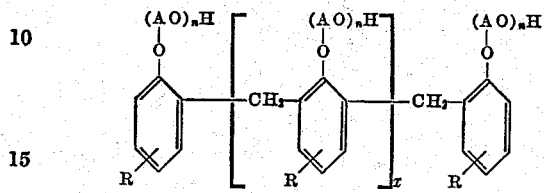

in which $x$ is an integer of six to twelve, $n$ is an integer of eight to eighty, A is an alkylene group of two to four carbon atoms, and R is an alkyl group of three to eighteen carbon atoms, which comprises bringing together at the reflux temperature in the range of about 80° to 145° C. a compound having the formula

with trioxane in molar proportions of about 1 to 0.3–0.33 respectively, in the presence of a strong aromatic sulfonic acid and an inert volatile organic solvent, to form a polymeric alkylphenol having an average molecular weight of at least 1640, removing said acid from the reaction medium, and then condensing in the presence of an alkali metal hydroxide said alkylphenol with an alkylene oxide having two to four carbon atoms.

3. A method for the preparation of compounds having the formula

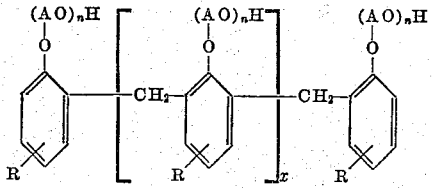

in which $x$ is an integer of six to twelve, $n$ is an integer of eight to eighty, A is an alkylene group of two to four carbon atoms, and R is an alkyl group of three to eighteen carbon atoms, which comprises bringing together at the reflux temperature in the range of about 80° to 145° C. a compound having the formula

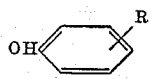

with trioxane in molar proportions of about 1 to 0.3–0.33 respectively, in the presence of toluenesulfonic acid and toluene, to form a polymeric alkylphenol having an average molecular weight of at least 1640, removing said acid from the reaction medium, and then condensing in the presence of an alkali metal hydroxide said alkylphenol with an alkylene oxide having two to four carbon atoms.

References Cited in the file of this patent

UNITED STATES PATENTS 2,498,656     De Groote et al.     Feb. 28, 1950

FOREIGN PATENTS 594,475     Great Britain     Nov. 12, 1947

OTHER REFERENCES

Walker: "Formaldehyde," A.C.S. Monograph No. 120 (1953), page 236.